United States Patent
Ge et al.

(10) Patent No.: US 10,967,743 B2
(45) Date of Patent: Apr. 6, 2021

(54) HYBRID DRIVE SYSTEM

(71) Applicant: Ford Global Technologies, LLC, Dearborn, MI (US)

(72) Inventors: Baoming Ge, Okemos, MI (US); Lihua Chen, Farmington Hills, MI (US); Yan Zhou, Canton, MI (US); Shuitao Yang, Dearborn Heights, MI (US); Fan Xu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 15/437,714

(22) Filed: Feb. 21, 2017

(65) Prior Publication Data

US 2018/0236877 A1    Aug. 23, 2018

(51) Int. Cl.
| | | |
|---|---|---|
| *B60L 50/15* | (2019.01) | |
| *B60L 50/16* | (2019.01) | |
| *B60L 15/00* | (2006.01) | |
| *B60L 50/61* | (2019.01) | |
| *H02P 27/06* | (2006.01) | |
| *H02P 27/08* | (2006.01) | |

(52) U.S. Cl.
CPC .............. *B60L 50/15* (2019.02); *B60L 15/007* (2013.01); *B60L 50/16* (2019.02); *B60L 50/61* (2019.02); *H02P 27/06* (2013.01); *B60L 2210/30* (2013.01); *B60L 2210/40* (2013.01); *B60L 2220/50* (2013.01); *H02P 27/08* (2013.01); *Y02T 10/64* (2013.01); *Y02T 10/70* (2013.01); *Y02T 10/7072* (2013.01); *Y02T 10/72* (2013.01)

(58) Field of Classification Search
CPC ...... H02P 2209/01; H02P 27/06; H02P 6/085; H02P 7/04; B60L 3/003; B60L 2210/42; B60L 2260/167
See application file for complete search history.

(56) References Cited

U.S. PATENT DOCUMENTS

| | | | |
|---|---|---|---|
| 8,497,648 B2 | 7/2013 | Tagome et al. | |
| 2008/0278102 A1* | 11/2008 | Taniguchi | B62D 5/046 318/400.27 |
| 2010/0231153 A1* | 9/2010 | Sakai | B60L 11/1814 318/400.32 |
| 2013/0001944 A1* | 1/2013 | Hickam | B60K 6/46 290/31 |
| 2013/0002186 A1* | 1/2013 | Iwahori | B60L 11/123 318/722 |
| 2015/0349679 A1 | 12/2015 | Rogers | |

FOREIGN PATENT DOCUMENTS

DE    102014223224 A1    8/2015

* cited by examiner

*Primary Examiner* — Bickey Dhakal
(74) *Attorney, Agent, or Firm* — David B. Kelley; Brooks Kushman P.C.

(57) ABSTRACT

A powertrain for a vehicle includes an electric machine coupled with a first inverter, a traction battery and a second inverter. The traction battery is coupled between a neutral terminal of the electric machine and a negative terminal of the first inverter. The second inverter is coupled in parallel with the first inverter with respect to a direct current (DC) bus, and configured to drive a second electric machine.

3 Claims, 7 Drawing Sheets

US 10,967,743 B2

HYBRID DRIVE SYSTEM

TECHNICAL FIELD

This application is generally related to hybrid vehicle powertrain having dual inverters/electric machines and a traction battery coupled between a neutral of one of the electric machines and a negative terminal of the inverters.

BACKGROUND

Electrified vehicles including hybrid-electric vehicles (HEVs) and battery electric vehicles (BEVs) rely on a traction (or high-voltage) battery to provide power to a traction motor for propulsion and a power inverter therebetween to convert direct current (DC) power to alternating current (AC) power. The typical AC traction motor is a 3-phase motor that may be powered by 3 sinusoidal currents each driven with 120 degrees phase separation. The traction battery is configured to operate in a particular voltage range and provide a desired energy.

Also, many electrified vehicles include a DC-DC converter, also referred to as a variable voltage converter (VVC), to convert the voltage of the traction battery to an operational voltage level of the electric machine. The electric machine, that may include a traction motor and a generator, may require high voltage and high current. Due to the voltage and current requirements, a battery module and a power electronics module are typically in continuous communication. The battery module provides information for the vehicle control algorithms including battery voltage, battery current, and battery state-of-charge (SOC).

SUMMARY

A powertrain for a vehicle includes an electric machine coupled with a first inverter, a traction battery and a second inverter. The traction battery is coupled between a neutral terminal of the electric machine and a negative terminal of the first inverter. The second inverter is coupled in parallel with the first inverter with respect to a direct current (DC) bus, and configured to drive a second electric machine.

A method of controlling a powertrain by a controller includes modulating switches and offsetting the phase signals. Switches of a first inverter are modulated to generate phase signals for a wye wound electric machine. The phase signals are offset by a direct current (DC) bias applied to at least one phase of the electric machine such that a rotational torque of the electric machine associated with the DC bias is zero.

A powertrain for a vehicle includes a wye wound electric machine and a second electric machine. The wye wound electric machine is coupled between a first inverter and a traction battery, wherein the traction battery is coupled between a neutral terminal of the electric machine and a negative terminal of the first inverter. The second electric machine coupled with a second inverter that is coupled in parallel with the first inverter with respect to a direct current (DC) bus.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
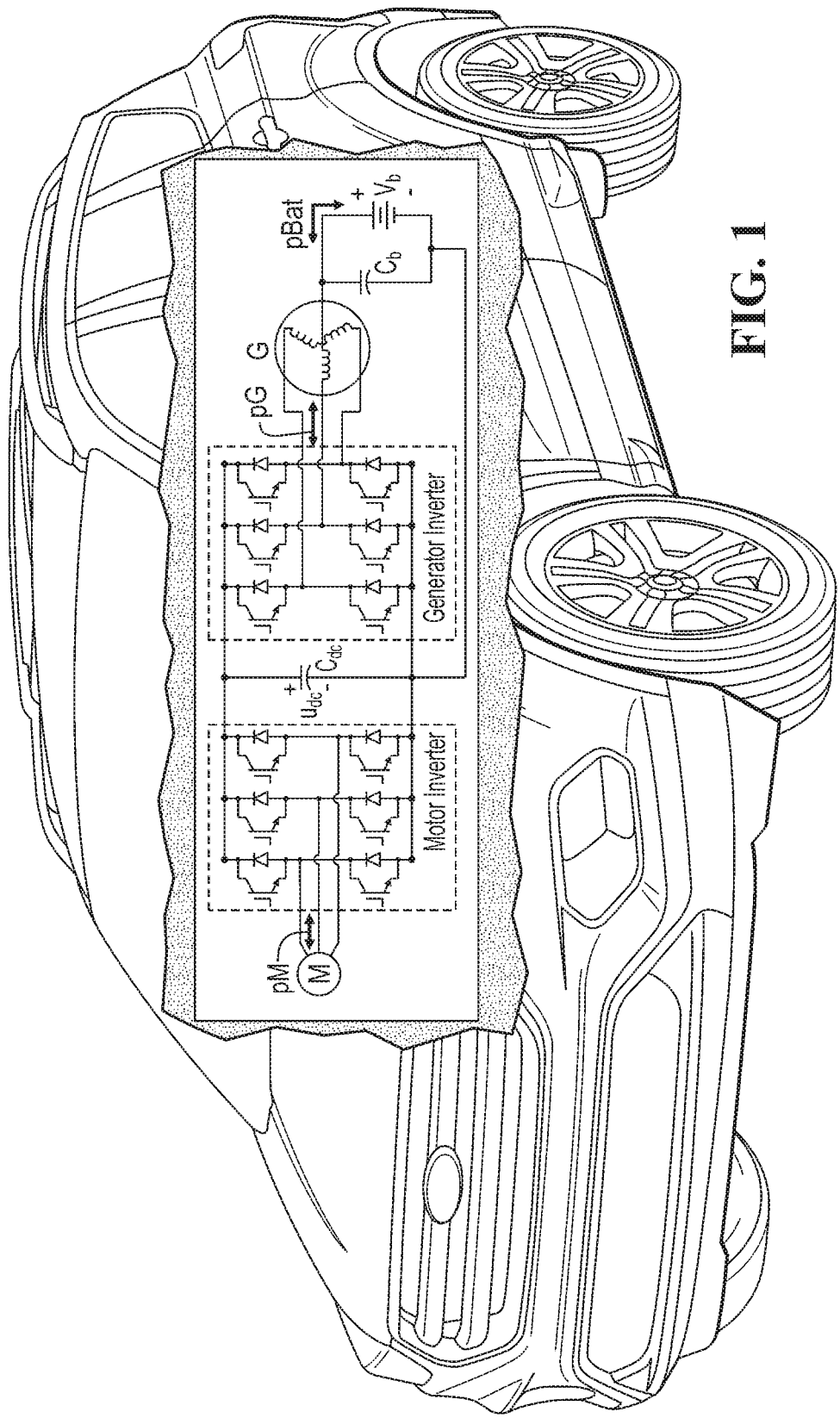
FIG. 1 is a diagram of an electrified vehicle having dual inverters/electric machines and a traction battery coupled between a neutral of one of the electric machines and a negative inverter terminal.

FIG. 1 depicts a hybrid electric vehicle having a powertrain including a traction battery that is coupled between a neutral terminal of a wye wound electric machine and a negative terminal of the electric machine inverter. Here, the electric machine is generator (G) and the electric machine inverter is the generator inverter. The generator inverter may be configured to flow a DC current with the battery (pBat), convert an AC current from the generator (pG) to a DC bus voltage (Vdc), or to boost a DC battery voltage (Vb) to the DC bus voltage (Vdc). Here, the DC current flowing to/from the battery through the generator flows equally in all three phases of the generator G such that no rotational torque is generated based on the DC current. This allows the DC current to flow through the generator inverter to the motor inverter at which point it is converted between DC and AC such that the energy can then be used to produce a propulsive force from the motor (M). Also, the motor (M) may be configured to convert a rotational force to an AC electric power that is then converted to DC power that flows through the generator inverter, then equally through the 3 phase winding of the generator (G) and to the traction battery.

Figure 2:
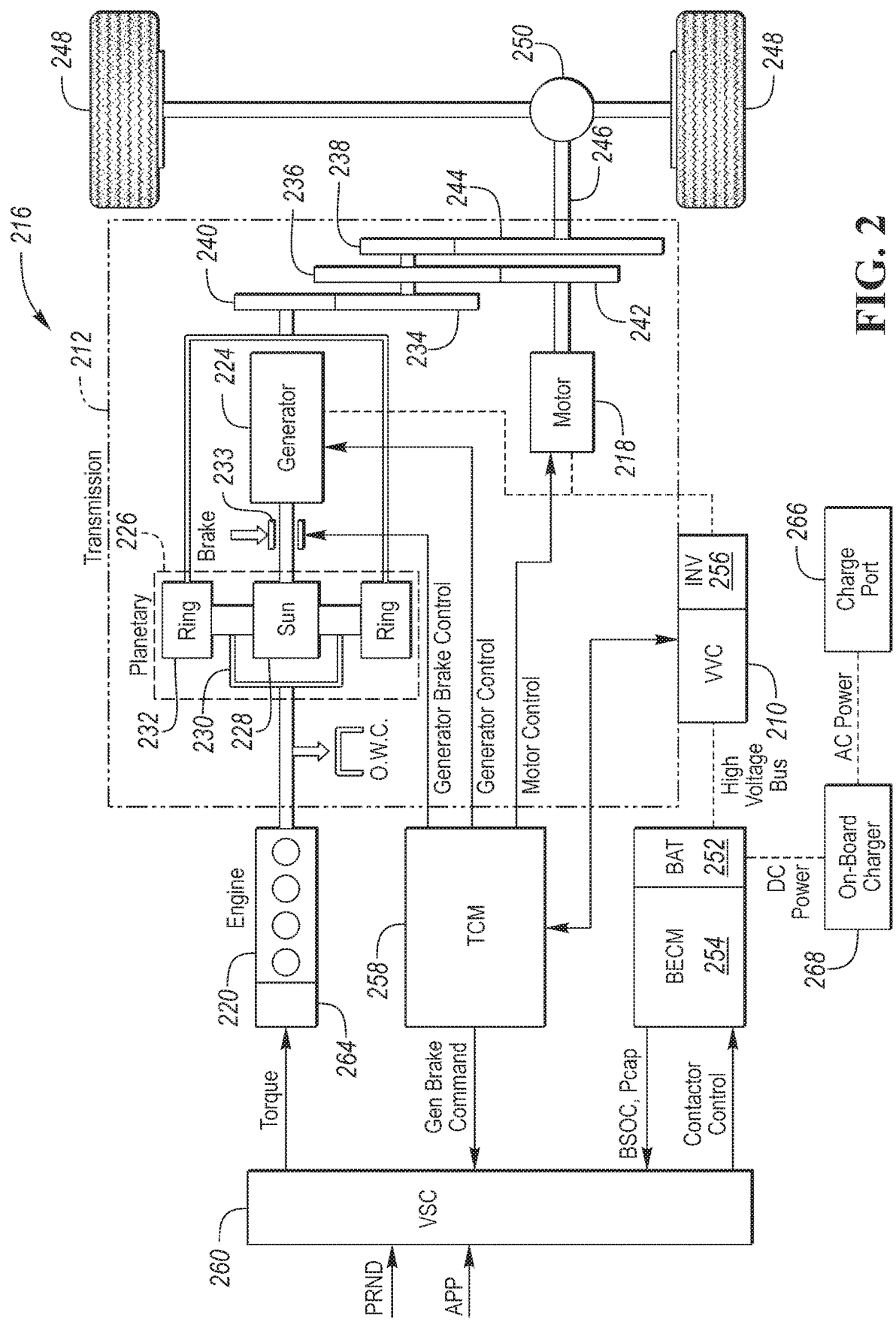
FIG. 2 is a diagram of a hybrid vehicle illustrating typical drivetrain and energy storage components including dual electric machines.

FIG. 2 is a diagram of a hybrid vehicle 216 illustrating typical drivetrain and energy storage components including dual electric machines and referred to generally as a vehicle 216. The vehicle 216 includes a transmission 212 and is propelled by at least one electric machine 218 with selective assistance from an internal combustion engine 220. The electric machine 218 may be an alternating current (AC) electric motor depicted as "motor" 218. The electric machine 218 receives electrical power and provides torque for vehicle propulsion. The electric machine 218 also functions as a generator for converting mechanical power into electrical power through regenerative braking.

The transmission 212 may be a power-split configuration. The transmission 212 includes the first electric machine 218 and a second electric machine 224. The second electric machine 224 may be an AC electric motor depicted as "generator" 224. Like the first electric machine 218, the second electric machine 224 receives electrical power and provides output torque. The second electric machine 224 also functions as a generator for converting mechanical power into electrical power and optimizing power flow through the transmission 212. In other embodiments, the transmission does not have a power-split configuration.

The transmission 212 may include a planetary gear unit 226, which includes a sun gear 228, a planet carrier 230, and a ring gear 232. The sun gear 228 is connected to an output shaft of the second electric machine 224 for receiving generator torque. The planet carrier 230 is connected to an output shaft of the engine 220 for receiving engine torque. The planetary gear unit 226 combines the generator torque and the engine torque and provides a combined output torque about the ring gear 232. The planetary gear unit 226 functions as a continuously variable transmission, without any fixed or "step" ratios.

The transmission 212 may also include a one-way clutch (O.W.C.) and a generator brake 233. The O.W.C. is coupled to the output shaft of the engine 220 to only allow the output shaft to rotate in one direction. The O.W.C. prevents the transmission 212 from back-driving the engine 220. The generator brake 233 is coupled to the output shaft of the second electric machine 224. The generator brake 233 may be activated to "brake" or prevent rotation of the output shaft of the second electric machine 224 and of the sun gear 228. Alternatively, the O.W.C. and the generator brake 233 may be eliminated and replaced by control strategies for the engine 220 and the second electric machine 224.

The transmission 212 may further include a countershaft having intermediate gears including a first gear 234, a second gear 236 and a third gear 238. A planetary output gear 240 is connected to the ring gear 232. The planetary output gear 240 meshes with the first gear 234 for transferring torque between the planetary gear unit 226 and the countershaft. An output gear 242 is connected to an output shaft of the first electric machine 218. The output gear 242 meshes with the second gear 236 for transferring torque between the first electric machine 218 and the countershaft. A transmission output gear 244 is connected to a driveshaft 246. The driveshaft 246 is coupled to a pair of driven wheels 248 through a differential 250. The transmission output gear 244 meshes with the third gear 238 for transferring torque between the transmission 212 and the driven wheels 248.

The vehicle 216 includes an energy storage device, such as a traction battery 252 for storing electrical energy. The battery 252 is a high-voltage battery that is capable of outputting electrical power to operate the first electric machine 218 and the second electric machine 224. The battery 252 also receives electrical power from the first electric machine 218 and the second electric machine 224 when they are operating as generators. The battery 252 is a battery pack made up of several battery modules (not shown), where each battery module contains a plurality of battery cells (not shown). Other embodiments of the vehicle 216 contemplate different types of energy storage devices, such as capacitors and fuel cells (not shown) that supplement or replace the battery 252. A high-voltage bus electrically connects the battery 252 to the first electric machine 218 and to the second electric machine 224.

The vehicle includes a battery energy control module (BECM) 254 for controlling the battery 252. The BECM 254 receives input that is indicative of vehicle conditions and battery conditions, such as battery temperature, voltage and current. The BECM 254 calculates and estimates battery parameters, such as battery state of charge and the battery power capability. The BECM 254 provides output (BSOC, Pcap) that is indicative of a battery state of charge (BSOC) and a battery power capability (Pcap) to other vehicle systems and controllers.

The vehicle 216 includes a DC-DC converter or variable voltage converter (VVC) 210 and an inverter 256. The VVC 210 and the inverter 256 are electrically connected between the traction battery 252 and the first electric machine 218, and between the battery 252 and the second electric machine 224. The VVC 210 "boosts" or increases the voltage potential of the electrical power provided by the battery 252. The VVC 210 also "bucks" or decreases the voltage potential of the electrical power provided to the battery 252, according to one or more embodiments. The inverter 256 inverts the DC power supplied by the battery 252 (through the VVC 210) to AC power for operating the electric machines 218, 224. The inverter 256 also rectifies AC power provided by the electric machines 218, 224, to DC for charging the traction battery 252. Other embodiments of the transmission 212 include multiple inverters (not shown), such as one invertor associated with each electric machine 218, 224. The VVC 210 includes an inductor assembly 214.

The transmission 212 includes a transmission control module (TCM) 258 for controlling the electric machines 218, 224, the VVC 210 and the inverter 256. The TCM 258 is configured to monitor, among other things, the position, speed, and power consumption of the electric machines 218, 224. The TCM 258 also monitors electrical parameters (e.g., voltage and current) at various locations within the VVC 210 and the inverter 256. The TCM 258 provides output signals corresponding to this information to other vehicle systems.

The vehicle 216 includes a vehicle system controller (VSC) 260 that communicates with other vehicle systems and controllers for coordinating their function. Although it is shown as a single controller, the VSC 260 may include multiple controllers that may be used to control multiple vehicle systems according to an overall vehicle control logic, or software.

The vehicle controllers, including the VSC 260 and the TCM 258 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 260 communicates with other vehicle systems and controllers (e.g., the BECM 254 and the TCM 258) over one or more wired or wireless vehicle connections using common bus protocols (e.g., CAN and LIN). The VSC 260 receives input (PRND) that represents a current position of the transmission 212 (e.g., park, reverse, neutral or drive). The VSC 260 also receives input (APP) that represents an accelerator pedal position. The VSC 260 provides output that represents a desired wheel torque and desired engine speed to the engine control module (ECM) 264; and generator brake commands to the TCM 258; and contactor control to the BECM 254.

The vehicle 216 includes an engine control module (ECM) 264 for controlling the engine 220. The VSC 260 provides output (desired engine torque) to the ECM 264 that is based on a number of input signals including APP, and corresponds to a driver's request for vehicle propulsion.

If the vehicle 216 is a PHEV, the battery 252 may periodically receive AC energy from an external power supply or grid, via a charge port 266. The vehicle 216 also includes an on-board charger 268, which receives the AC energy from the charge port 266. The charger 268 is an AC/DC converter which converts the received AC energy into DC energy suitable for charging the battery 252. In turn, the charger 268 supplies the DC energy to the battery 252 during recharging. Although illustrated and described in the context of a PHEV 216, it is understood that the inverter 256 may be implemented on other types of electric vehicles, such as a HEV or a BEV.

Figure 3:
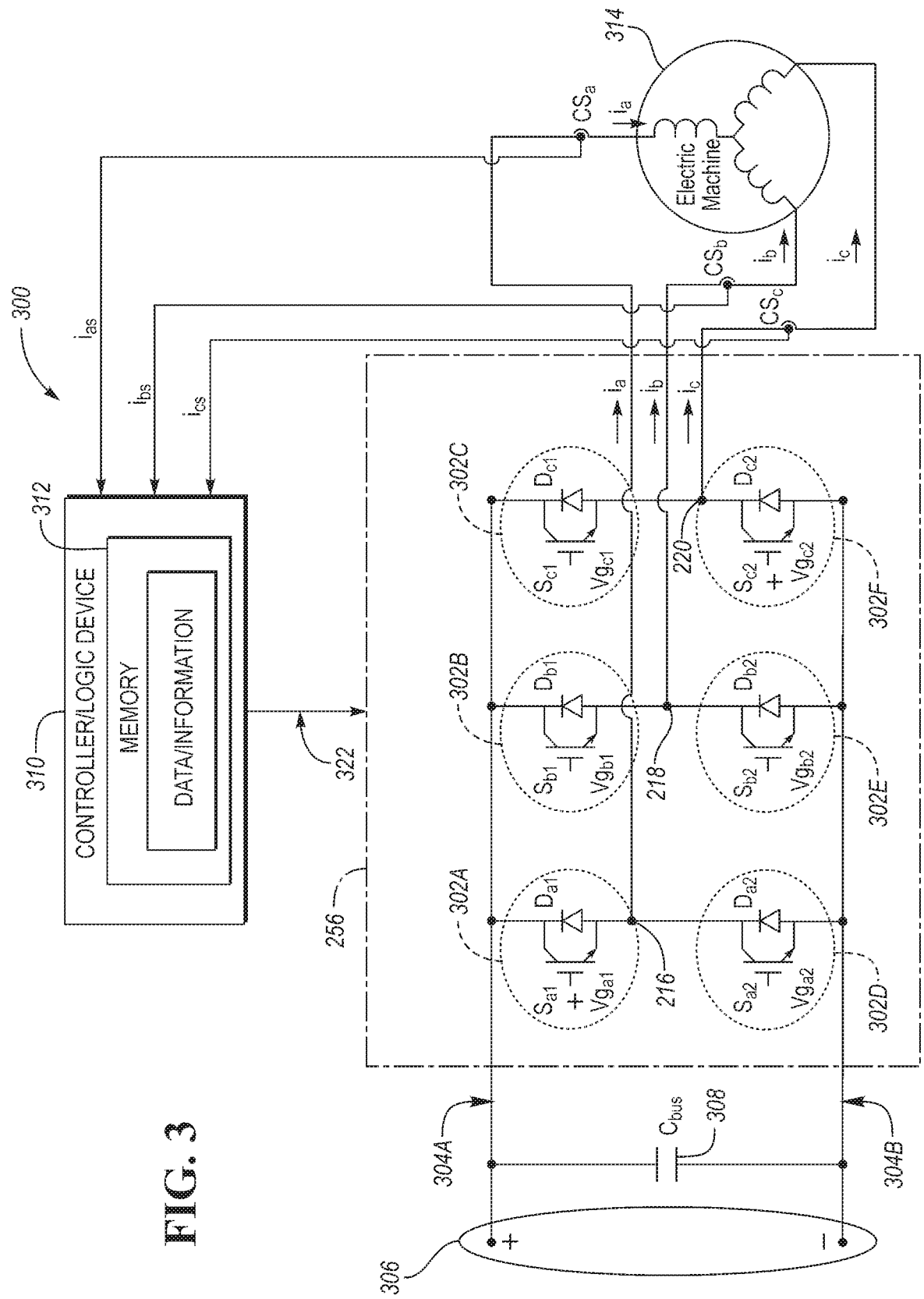
FIG. 3 is a schematic diagram of a power inverter of a power electronics module.

With reference to FIG. 3, a system 300 is provided for controlling a power electronics module (PEM) 256. The PEM 256 of FIG. 3 is shown to include a plurality of switches 302 (e.g., IGBTs) configured to collectively operate as an inverter with first, second, and third phase legs 216, 218, 220. While the inverter is shown as a three-phase converter, the inverter may include additional phase legs. For example, the inverter may be a four-phase converter, a five-phase converter, a six-phase converter, etc. In addition, the PEM 256 may include multiple converters with each inverter in the PEM 256 including three or more phase legs. For example, the system 300 may control two or more inverters in the PEM 256. The PEM 256 may further include a DC to DC converter having high power switches (e.g., IGBTs) to convert a power electronics module input voltage to a power electronics module output voltage via boost, buck or a combination thereof.

As shown in FIG. 3, the inverter may be a DC-to-AC converter. In operation, the DC-to-AC converter receives DC power from a DC power link 306 through a DC bus 304 and converts the DC power to AC power. The AC power is transmitted via the phase currents ia, ib, and is to drive an AC machine also referred to as an electric machine 314, such as a three-phase permanent-magnet synchronous motor (PMSM) as depicted in FIG. 3. In such an example, the DC power link 306 may include a DC storage battery to provide DC power to the DC bus 304. In another example, the inverter may operate as an AC-to-DC converter that converts AC power from the AC machine 314 (e.g., generator) to DC power, which the DC bus 304 can provide to the DC power link 306. Furthermore, the system 300 may control the PEM 256 in other power electronic topologies.

With continuing reference to FIG. 3, each of the phase legs 216, 218, 220 in the inverter includes power switches 302, which may be implemented by various types of controllable switches. In one embodiment, each power switch 302 may include a diode and a transistor, (e.g., an IGBT). The diodes of FIG. 3 are labeled $D_{a1}$, $D_{a2}$, $D_{b1}$, $D_{b2}$, $D_{c1}$, and $D_{c2}$ while the IGBTs of FIG. 3 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 216 in FIG. 3. Similarly, the power switches $S_{b1}$, $S_{b2}$, $D_{b1}$, and $D_{b2}$ are part of phase leg B 218 and the power switches $S_{c1}$, $S_{c2}$, $D_{c1}$, and $D_{c2}$ are part of phase leg C 220 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 3, current sensors $CS_a$, $CS_b$, and $CS_c$ are provided to sense current flow in the respective phase legs 216, 218, 220. FIG. 3 shows the current sensors $CS_a$, $CS_b$, and $CS_c$ separate from the PEM 256. However, current sensors $CS_a$, $CS_b$, and $CS_c$ may be integrated as part of the PEM 256 depending on its configuration. Current sensors $CS_a$, $CS_b$, and $CS_c$ of FIG. 3 are installed in series with each of phase legs A, B and C (i.e., phase legs 216, 218, 220 in FIG. 3) and provide the respective feedback signals $i_{as}$, $i_{bs}$, and $i_{cs}$ (also illustrated in FIG. 3) for the system 300. The feedback signals $i_{as}$, $i_{bs}$, and $i_{as}$ may be raw current signals processed by logic device (LD) 310 or may be embedded or encoded with data or information about the current flow through the respective phase legs 216, 218, 220. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 3, the system 300 includes a logic device (LD) or controller 310. The controller or LD 310 can be implemented by various types or combinations of electronic devices and/or microprocessor-based computers or controllers. To implement a method of controlling the PEM 256, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 3, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 216, 218, 220 and into the respective windings of the electric machine 314 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 3 is shown separate from the PEM 256. However, the DC-bus capacitor 308 may be integrated as part of the PEM 256.

As shown in FIG. 3, a storage medium 312 (hereinafter "memory"), such as computer-readable memory may store the computer program or algorithm embedded or encoded with the method. In addition, the memory 312 may store data or information about the various operating conditions or components in the PEM 256. For example, the memory 312 may store data or information about current flow through the respective phase legs 216, 218, 220. The memory 312 can be part of the controller 310 as shown in FIG. 3. However, the memory 312 may be positioned in any suitable location accessible by the controller 310.

As illustrated in FIG. 3, the controller 310 transmits at least one control signal 322 to the power converter system 256. The power converter system 256 receives the control signal 322 to control the switching configuration of the inverter and therefore the current flow through the respective phase legs 216, 218, and 220. The switching configuration is a set of switching states of the power switches 302 in the inverter. In general, the switching configuration of the inverter determines how the inverter converts power between the DC power link 306 and the electric machine 314.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 3) control the switching state and characteristics of the respective power switches 302. While the inverter is shown as a voltage-driven device in FIG. 3, the inverter may be a current-driven device or controlled by other strategies that switch the power switch 302 between ON and OFF states. The controller 310 may change the gate drive for each IGBT based on the rotational speed of the electric machine 314, the mirror current, or a temperature of the IGBT switch. The change in gate drive may be selected from a plurality of gate drive currents in which the change gate drive current is proportional to a change in IGBT switching speed.

As also shown in FIG. 3, each phase leg 216, 218, and 220 includes two switches 302. However, only one switch in each of the legs 216, 218, 220 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 3: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

Solid State Devices (SSD), such as Insulated Gate Bipolar Junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 4:
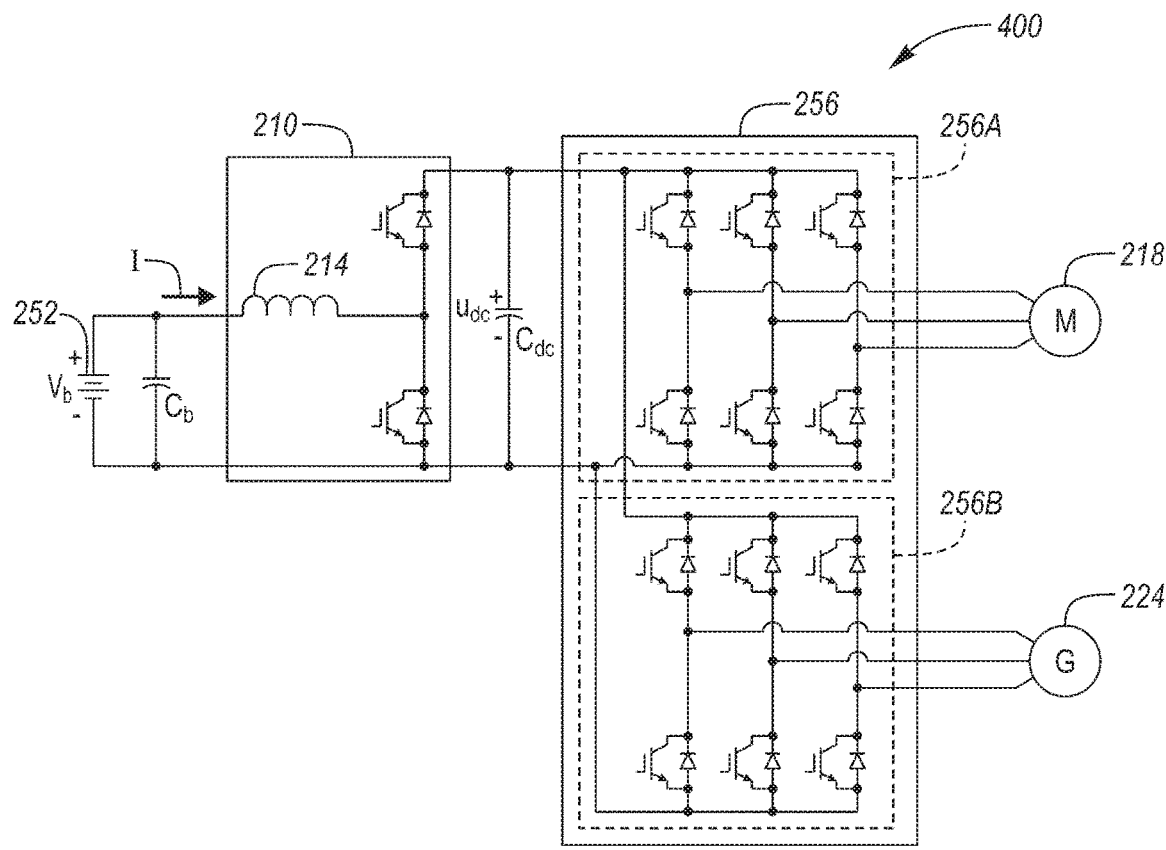
FIG. 4 is a schematic diagram of a traditional dual electric machine hybrid vehicle powertrain.

FIG. 4 is a schematic diagram of a traditional dual electric machine hybrid vehicle powertrain 400. This typical Hybrid Electric Vehicle (HEV) drive system 400, includes two electric machines (a first electric machine configured as a traction motor 218, a second electric machine configured as a generator 224), a variable voltage converter (VVC) 210, and a traction battery 252. The electric machines (e.g., motor 218 and/or the generator 224) may be able to operate in both a propulsion or generation mode, the former operation mode consumes power/energy and the latter operation mode produces power/energy. These three parts are coupled via a DC bus capacitor, where a voltage of traction battery 252 is typically boosted by the VVC 210 to a DC bus voltage that is used to drive the electric machines 218, 224.

The VVC 210 manages the power and energy of the traction battery 252 to ensure a desired constant DC bus voltage regardless of the motor/generator power. The VVC 210 typically includes two IGBTs and one inductor, thereby having the following drawbacks. First, due to the physical size, the VVC 210 is difficult to package and mount in a vehicle. Second, high power losses of the inductor and the two IGBTs result in low efficiency of E-drive system. Third, as the inductor heats up, the ability to cool the inductor adds additional complexity. Fourth, due to the additional components, the VVC typically adds extra cost and weight to the system and vehicle. Lastly, as the magnetic core of inductor is typically temperature-sensitive, such that performance may be unstable when the core experiences high temperatures, and temperature variations during operation, that may lead to saturation.

Figure 5:
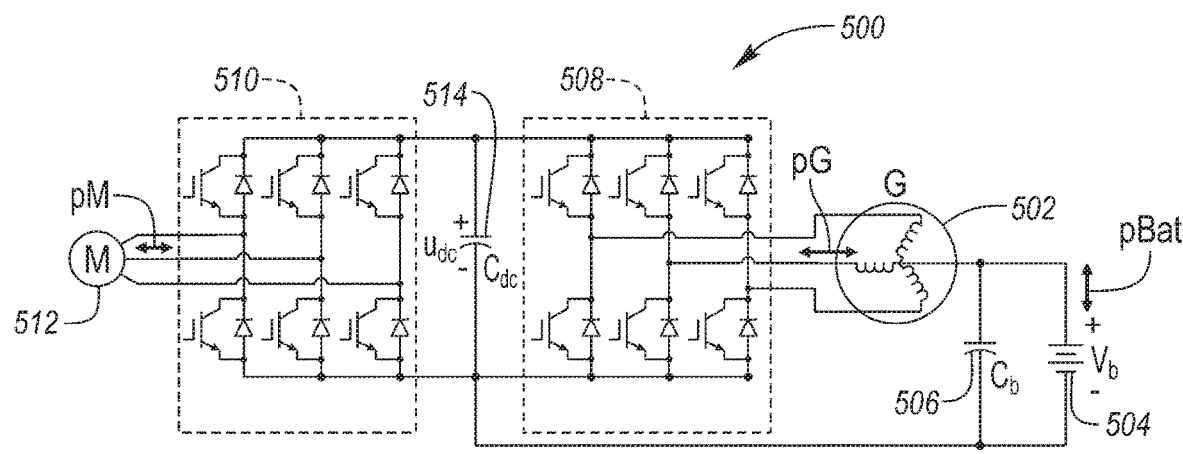
FIG. 5 is a schematic diagram of a dual electric machine hybrid vehicle powertrain including a traction battery coupled between a neutral terminal of one of the electric machines and a negative inverter terminal.

FIG. 5 is a schematic diagram of a dual electric machine hybrid vehicle powertrain 500. The powertrain includes a wye wound electric machine 502, a traction battery 504 with a battery bulk capacitor also referred to as a smoothing capacitor 506, a first inverter 508 coupled with the wye wound electric machine 502 and a second inverter 510 coupled with a second electric machine 512. Both inverters are coupled in parallel with a DC bus capacitor 514. The traction battery 504 is coupled between a neutral terminal of the wye wound electric machine 502 and a negative inverter terminal (e.g., the first inverter 508 or the second inverter 510).

This new powertrain system or E-drive system operates dual electric machines without the need of a DC/DC converter also referred to as a variable voltage converter (VVC), thus VVC related drawbacks above are reduced or completely avoided. Here, the electric machine 512 configured as a motor (M) is controlled by the motor inverter 510 that may be configured to operating in a traditional way to fulfill bidirectional power flow. The electric machine 502 configured as generator (G) and battery is controlled by the generator inverter 508 to achieve bidirectional power flows. Thus, the two inverters (508, 510) manage three sources (electric machine 502, electric machine 512, and battery 504), such that all three sources may implement bidirectional power flows.

In another embodiment, the electric machine (G) 502 and generator inverter 508 may be a 6-phase wye wound electric machine. A 6-phase electric machine/inverter may be configured with a phase separation of 60 degrees. Similar to the operation of a 3-phase electric machine, a 6-phase electric machine/inverter may be configured to flow a current equally in all 6-phases of the electric machine. However, the 6-phase electric machine/inverter may also be configured to flow a current equally in a subset of phases, such as 3 phases and not all 6 phases of the electric machine. This may be accomplished if the 3 phases are equally separated from each other (i.e., 120 degrees separated).

In yet another embodiment, the electric machine (G) 502 and generator inverter 508 may be a 9-phase wye wound electric machine. A 9-phase electric machine/inverter may be configured with a phase separation of 40 degrees. Similar to the operation of a 3-phase electric machine, a 9-phase electric machine/inverter may be configured to flow a current equally in all 9-phases of the electric machine. However, the 9-phase electric machine/inverter may also be configured to flow a current equally in a subset of phases, such as 3 phases or 6 phases and not all 9 phases of the electric machine. This may be accomplished if the 3 or 6 phases are equally separated from each other (i.e., 120 degrees separated).

Figure 6:
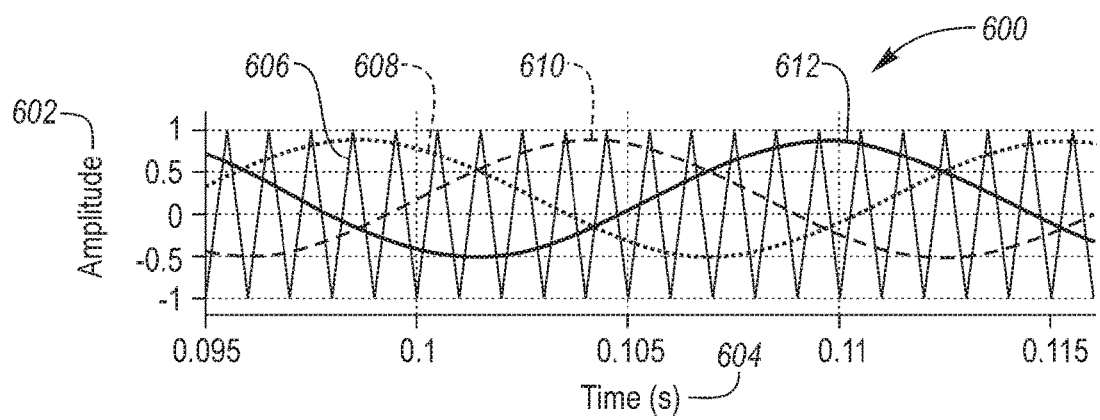
FIG. 6 is a graphical representation of a modulation method to control an inverter of an electric machine having a traction battery coupled between a neutral terminal of the electric machine and a negative inverter terminal.

FIG. 6 is a graphical representation of a modulation method 600 to control an inverter of an electric machine having a traction battery coupled between a neutral terminal of the electric machine and a negative inverter terminal (e.g., the generator inverter 508 of FIG. 5) with respect to time 604. In this graph, a normalized amplitude 602 of the represented signals is shown with respect to time 604. A carrier signal 606 is shown as a reference with three modulation signals ma 608, mb 612, and mc 610, offset by Dbat, that are used to control the generator 502. The duty cycle Dbat manages the battery for charging or discharging. The combined modulation signals ma 608, mb 612, mc 610, offset by Dbat, control both generator (e.g., 502) and battery (e.g., 504) through switching six switches of generator inverter (e.g., 508). The DC bus voltage (e.g., udc across capacitor 514) is controlled to be substantially constant by the duty cycle of Dbat. Here, stator windings of the generator (e.g., 502) carry currents consisted of two components (i.e., an AC component and a DC component). First, the AC component that includes sinusoidal currents that produce a torque or are generated in the presence of a torque in the generator (e.g., 502). Second, the DC component is a current flow with the traction battery such that one-third of battery current passes through each phase winding of the generator (e.g., 502). As the DC component passes equally in each phase, the DC component does not apply a torque on the generator rotor, so it will not affect generation/propulsion operation of generator (e.g., 502).

Figure 7:
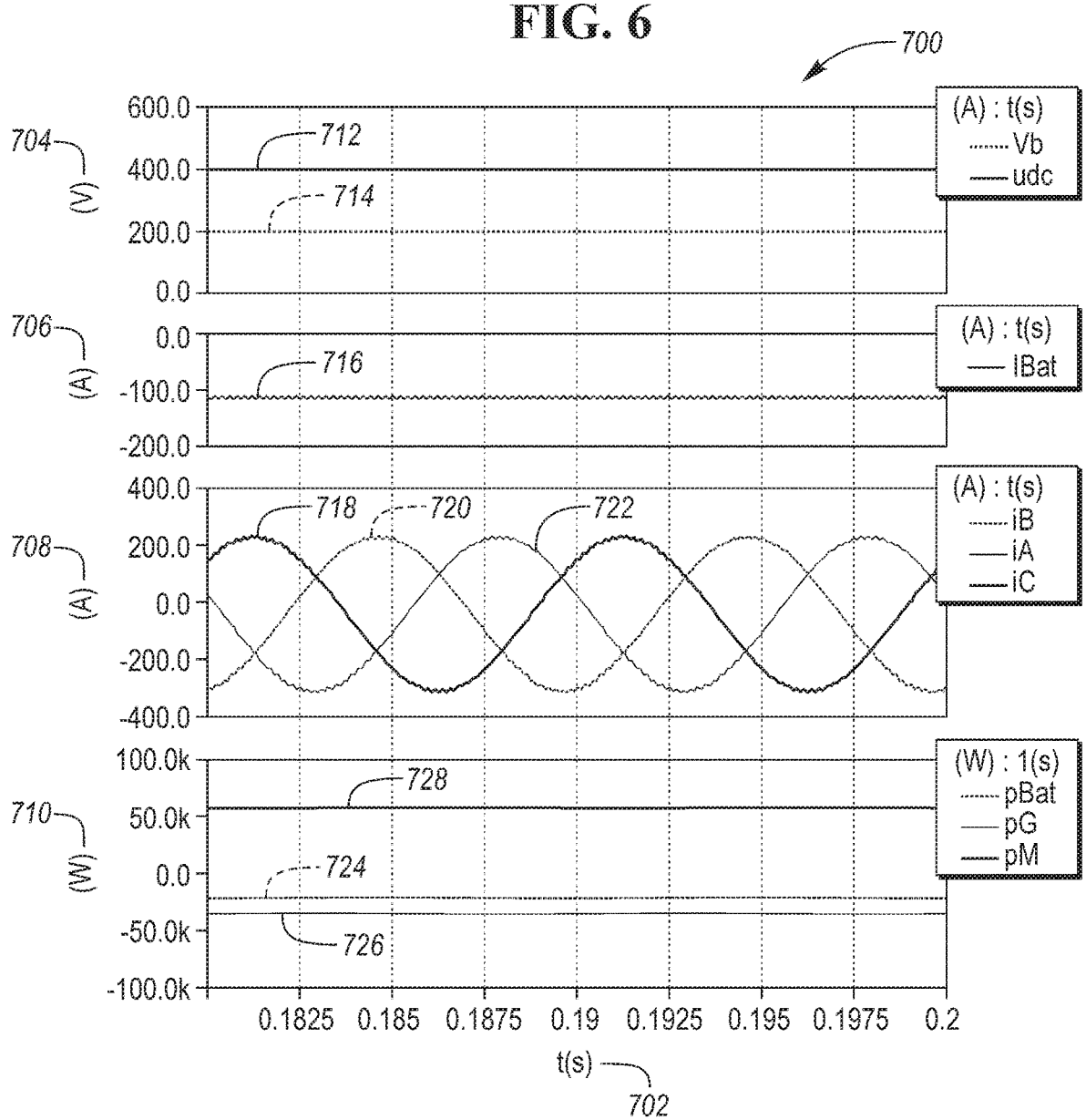
FIG. 7 is a graphical representation of AC characteristics of dual electric machines in which one of the electric machines has a traction battery coupled between a neutral terminal and a negative inverter terminal during propulsion mode.

FIG. 7 is a graphical representation of electrical characteristics 700 of dual electric machines with respect to time 702 during propulsion mode. Here, one of the electric machines is wye wound and has a traction battery coupled between a neutral terminal of the wye windings and a negative inverter terminal. The electric characteristics include a DC bus voltage 712 at bus capacitor (e.g., 514), a battery voltage 714 (both measured in volts 704), a battery current 716 measured in amps 706, phase currents ia 722, ib 720, ic 718 measured in amps 708, and a motor power 728, a generator power 726, and a battery power 724 all measured in watts 710.

During propulsion, the battery is supplying approximately −100 A as shown by element 716 and the phase current ia 722, ib 720, ic 718 have an approximate peak to peak current of approximately 600 Amps with the sinusoidal current offset by one-third of Ibat 716. This provides a motor power 728 to the motor (e.g., 512) of over 50 KW while sourcing the power from both the generator (e.g., 502) and the battery (e.g., 504).

Figure 8:
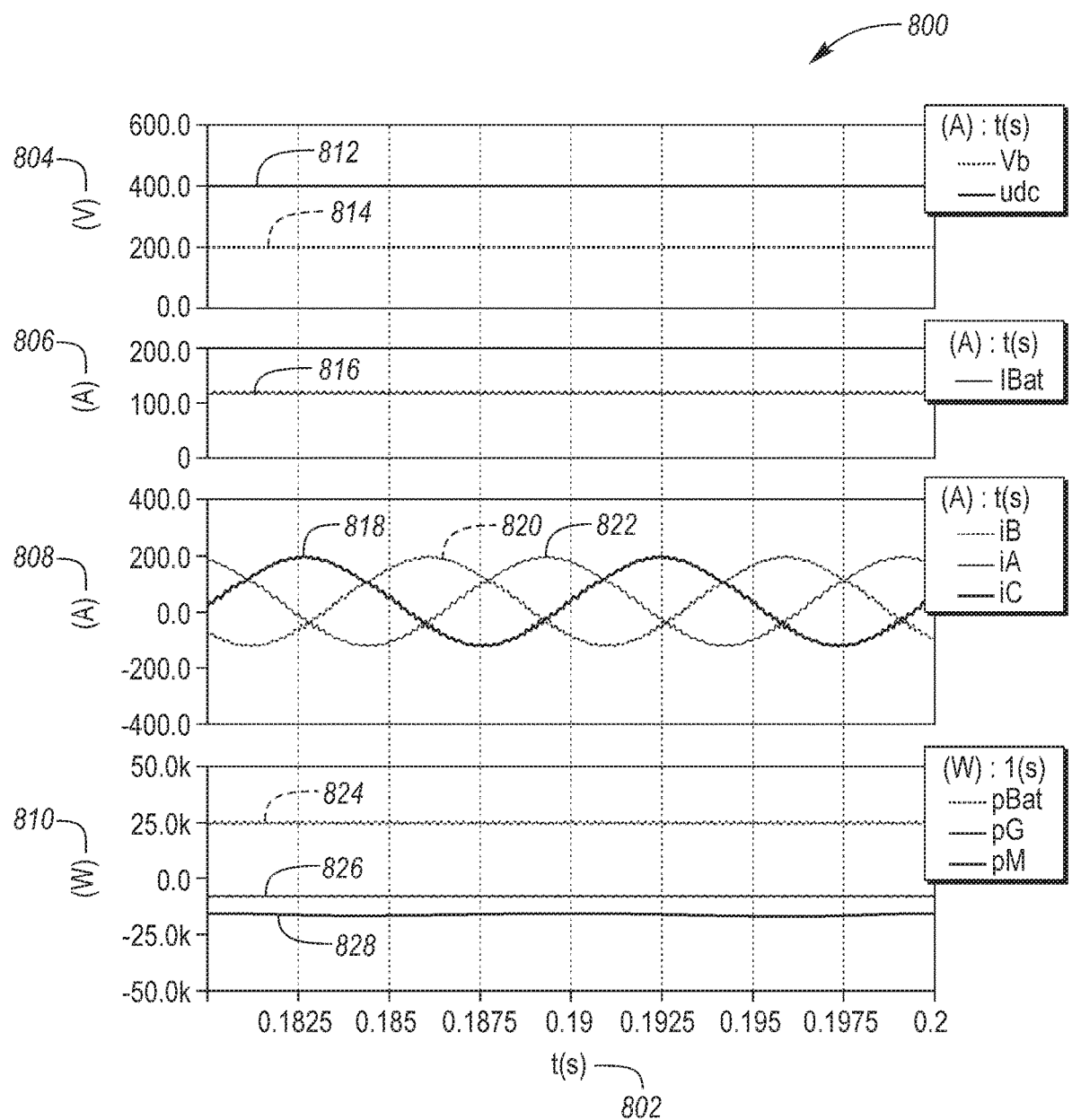
FIG. 8 is a graphical representation of AC characteristics of dual electric machines in which one of the electric machines has a traction battery coupled between a neutral terminal and a negative inverter terminal during charge mode.

FIG. 8 is a graphical representation of electrical characteristics 800 of dual electric machines with respect to time 802 during charge mode. Here, one of the electric machines is wye wound and has a traction battery coupled between a neutral terminal of the wye windings and a negative inverter terminal. The electric characteristics include a DC bus voltage 812 at bus capacitor (e.g., 514), a battery voltage 814 (both measured in volts 804), a battery current 816 measured in amps 806, phase current ia 822, ib 820, ic 818 measured in amps 808, and a motor power 828, a generator power 826, and a battery power 824 all measured in watts 810.

During charging, the battery may be supplying approximately 100 A as shown by element 816 and phase current ia 822, ib 820, ic 818 having an approximate peak to peak current of approximately 300 Amps with the sinusoidal current offset by one-third of Ibat 816. This sources a motor power 828 from the motor (e.g., 512) and a generator power 826 from the generator (e.g., 502) to the battery (e.g., 504). Here, both the motor (e.g., 512) and the generator (e.g., 502) generate power from rotational energy (i.e., a rotational speed*torque) to supply a battery power 824 flowing into the battery (e.g., 504).

Figure 9:
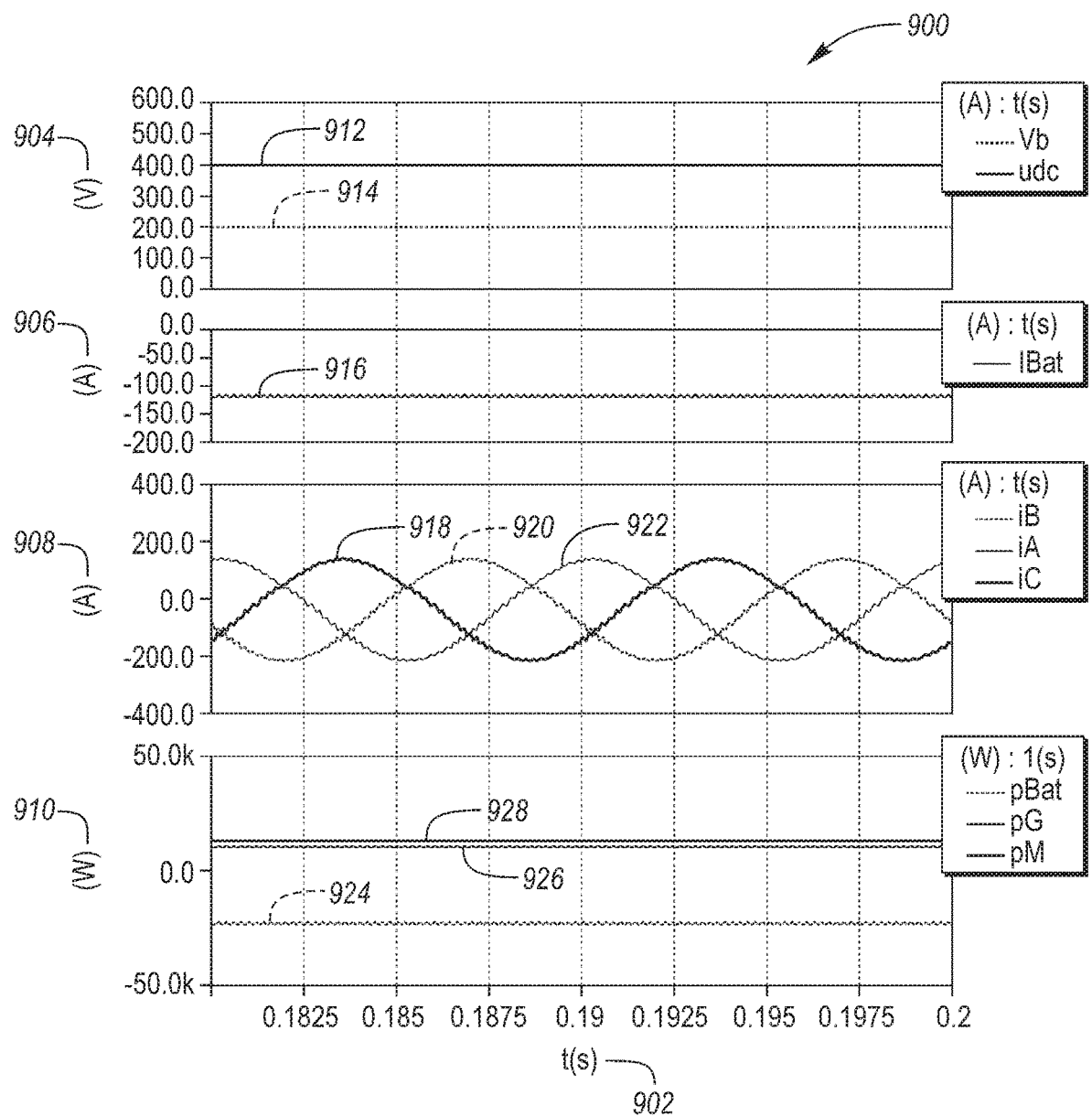
FIG. 9 is a graphical representation of AC characteristics of dual electric machines in which one of the electric machines has a traction battery coupled between a neutral terminal and a negative inverter terminal during propulsion mode.

FIG. 9 is a graphical representation of electrical characteristics 900 of dual electric machines with respect to time 902 during propulsion mode. Here, one of the electric machines is wye wound and has a traction battery coupled between a neutral terminal of the wye windings and a negative inverter terminal. The electric characteristics include a DC bus voltage 912 at bus capacitor (e.g., 514), a battery voltage 914 (both measured in volts 904), a battery current 916 measured in amps 906, phase current ia 922, ib 920, ic 918 measured in amps 908, and a motor power 928, a generator power 926, and a battery power 924 all measured in watts 910.

During propulsion in this configuration, the battery is supplying approximately −100 A as shown by element 916 and the phase current ia 922, ib 920, ic 918 have an approximate peak to peak current of approximately 300 Amps with the sinusoidal current offset by one-third of Ibat 916. This provides a motor power 928 to the motor (e.g., 512) and a generator power 926 to the generator (e.g., 502) from the battery (e.g., 504). Here, both the motor (e.g., 512) and the generator (e.g., 502) provide a propulsive force (i.e., apply a rotational torque) from a battery power 924 flowing from the battery (e.g., 504).

In FIGS. 7 and 9, a traction battery is used to provide a propulsive force based on a demand, a controller may operate the inverters to generate the propulsive force from the motor (e.g., 512) only using both the generator (e.g., 502) and the battery (e.g., 504) to supply the power to generate the rotational force from the motor, as shown in FIG. 7. However, if the demand exceeds the first request threshold, the controller may operate the inverters to generate the propulsive force from both the motor (e.g., 512) and the generator (e.g., 502) using only the battery (e.g., 504) to supply the power to generate the rotational force from the motor and generator, as shown in FIG. 9.

Likewise, charging the traction battery may be done by one or both the motor (e.g., 512) and the generator (e.g., 502) based on a power demand and a battery state of charge (SOC), if the power demand exceeds a second threshold, a controller may operate the inverters to generate power only using the generator (e.g., 502) thus allowing the motor (e.g., 512) to operate. However, if the demand is less than the second threshold, the controller may operate the inverters to generate power from both the motor (e.g., 512) and the generator (e.g., 502), for example during regenerative braking, thereby providing maximum charging to the battery (e.g., 504), as shown in FIG. 8.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a powertrain comprising:
   by a controller,
   modulating switches of a first inverter to generate phase signals for a 6-phase or 9-phase wye wound electric machine; and
   offsetting the phase signals by a direct current (DC) bias applied to less than all phases of the electric machine such that a rotational torque of the electric machine associated with the DC bias is zero.

2. The method of claim 1, wherein the DC bias is applied by a traction battery coupled between a neutral terminal of the electric machine and a negative terminal of the first inverter.

3. The method of claim 2 further comprising modulating signals of a second inverter, coupled in parallel with the first inverter, to drive a second electric machine with power from the traction battery.

* * * * *